United States Patent [19]

Nerz et al.

[11] Patent Number: 5,436,426
[45] Date of Patent: Jul. 25, 1995

[54] FIXTURE AND METHOD FOR COOLING TUBULAR SUBSTRATE DURING THERMAL SPRAYING

[75] Inventors: John E. Nerz, Nesconset, N.Y.; David J. Urevich, Allentown, Pa.

[73] Assignee: Sulzer Metco (US), Inc., Westbury, N.Y.

[21] Appl. No.: 49,743

[22] Filed: Apr. 19, 1993

[51] Int. Cl.⁶ .................................................. B23K 10/00
[52] U.S. Cl. .................. 219/121.490; 219/121.48; 219/121.58; 219/158; 219/121.47; 427/446; 427/398.1; 427/398.4
[58] Field of Search ............ 219/121.47, 121.48, 219/121.49, 76.15, 76.16, 121.59, 121.58, 158–161; 427/398.1, 398.2, 398.3, 398.4, 398.5, 535, 569, 446–450

[56] References Cited

U.S. PATENT DOCUMENTS

| | | |
|---|---|---|
| 3,631,835 | 1/1972 | Hamontre et al. ............... 118/47 |
| 4,265,930 | 5/1981 | Shinohara et al. .............. 427/34 |
| 4,297,388 | 10/1981 | Kumar et al. ................... 427/47 |
| 4,445,021 | 4/1984 | Irons et al. ..................... 219/121 |
| 4,505,945 | 3/1985 | Dubust et al. .................. 427/8 |
| 4,621,183 | 11/1986 | Takeuchi et al. ............... 219/121.47 |
| 5,204,145 | 4/1993 | Gasworth ....................... 427/577 |
| 5,250,780 | 10/1993 | Hansz et al. ................... 219/121.49 |
| 5,293,026 | 3/1994 | Dennis et al. .................. 219/121.59 |

Primary Examiner—Mark H. Paschall
Attorney, Agent, or Firm—H. S. Ingham

[57] ABSTRACT

A cooling fixture for thermal spraying includes a rotatable tubular member for supporting a tubular substrate such as for an oxygen sensor. A cooling tube extends from the tubular member into an open end of the substrate so as to delimit an annular channel therein. The other end of the substrate is closed. Air is forced through the cooling tube into the substrate and thence out via the annular channel, to cool the substrate during thermal spray coating of the outside surface.

19 Claims, 2 Drawing Sheets

FIXTURE AND METHOD FOR COOLING TUBULAR SUBSTRATE DURING THERMAL SPRAYING

This invention relates to thermal spraying, to cooling a substrate for thermal spraying, particularly to cooling a tubular ceramic substrate, and most particularly for producing an oxygen sensor.

BACKGROUND OF THE INVENTION

Thermal spraying, also known as flame spraying, involves the melting or at least heat softening of a heat fusible material such as a metal or ceramic, and propelling the softened material in particulate form against a surface which is to be coated. The heated particles strike the surface where they are quenched and bonded thereto. In a plasma type of thermal spray gun, a plasma stream is used to melt and propel powder particles. A high intensity arc within the gun heats and accelerates an inert gas such as argon or nitrogen to effect a plasma stream. An example of such a gun is described in U.S. Pat. No. 4,445,021. As shown in the patent, plasma guns typically are cooled by water channelling that direct the water over the electrode surfaces. Other types of thermal spray guns include a combustion spray gun in which powder is entrained and heated in a combustion flame, either at moderate velocity or high velocity (supersonic). In a wire type of gun a wire is fed through a combustion flame where a melted wire tip is atomized by compressed air into a fine spray for deposit. A two-wire arc gun melts contacting wire tips with an electrical arc for atomization by compressed air.

Although an aspect of thermal spraying is heating of the workpiece by the hot flame or plasma issuing from the gun and by the heated material depositing on the workpiece, the workpiece generally is maintained at relatively low temperature. The gun is traversed repetitively across the substrate being coated so as to distribute the coating particles and prevent local hot spots. Additionally, a jet or flow of coolant is impinged on the workpiece, away from the spray spot, to maintain temperature within several hundred degrees of room temperature. Cooling of the backside of a flat workpiece with air and water are disclosed respectively in U.S. Pat. Nos. 3,631,835 and 4,297,388. Excessive or uneven heating can result in oxidation of a metal substrate or cracking of a ceramic substrate.

Moreover, effective impingement of coolant onto a small workpiece can interfere with the spray stream and deposits. Cooling air must be very clean so as not to contaminate the coating. Also, spot cooling of cylindrical substrates is not very uniform, leading to stress. An example of a small cylindrical part to be coated is an oxygen sensor for pollution control in automotive engines, as disclosed in U.S. Pat. No. 4,265,930. The substrate in this case is formed of a tubular member of ceramic such as zirconium oxide. As is typical of automotive engine parts, low cost of production is an objective. Higher spray rate will achieve lower cost, but applies more heat to the substrate. This higher heat, even with conventional cooling methods, has resulted in cracking of the ceramic substrates.

Therefore, objects of the invention are to provide a novel cooling fixture and an improved method for cooling a tubular substrate, particularly a tubular ceramic substrate, during thermal spray coating thereof. Further objects are to provide a novel cooling fixture and an improved method for supporting and cooling a substrate for thermal spray coating of an oxygen sensor. Another object is to provide more uniform cooling of a tubular substrate. Yet another object is to allow thermal spraying of small tubular substrates at high spray rate.

SUMMARY OF THE INVENTION

Foregoing and other objects are achieved by a fixture for cooling a tubular substrate during thermal spray coating thereof, the substrate having an inside surface, an outside surface, an open end and a closed end. The fixture comprises support means for supporting the substrate at one end thereof, and a cooling tube extending coaxially through the open end into the substrate so as to delimit an annular channel between the inside surface and the cooling tube. The cooling tube has an outer end receptive of pressurized fluid coolant such that coolant flows through the cooling tube into the substrate and thence out of the substrate via the annular channel, whereby the coolant cools the substrate during thermal spray coating of the outside surface. The support means advantageously is rotatable, with the substrate being aligned coaxially with the support means so as to be rotatable on a longitudinal axis during the thermal spray coating thereof. With the outside surface being receptive of the coating between the closed end and a coating extremity at a selected separation from the closed end, the cooling tube preferably has an inner end disposed at a distance from the extremity between about one quarter and one half of the selected separation. The fixture is particularly suitable where the tubular substrate comprises a ceramic base member, most particularly for an oxygen sensor.

Objects also are achieved by a method of cooling a tubular substrate during thermal spray coating thereof, the substrate having an open end and a closed end. The method comprises supporting the substrate at one end, and extending a cooling tube coaxially through the open end into the substrate so as to delimit an annular channel between the substrate and the cooling tube. The method further comprises flowing pressurized fluid coolant through the cooling tube from an outer end thereof into the substrate and thence out of the substrate via the annular channel, and thermal spray coating the outside surface of the substrate. The coolant thereby cools the substrate during the thermal spray coating process.

DETAILED DESCRIPTION OF THE INVENTION

Figure 1:
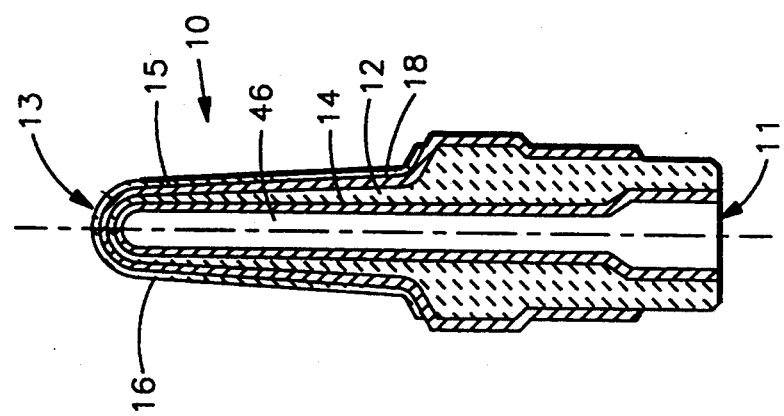
FIG. 1 is a longitudinal section of an oxygen sensor produced according to the invention.

A tubular substrate 10 (FIG. 1) to be coated is formed of metal or ceramic, the preferred example herein being an oxygen sensor comprising a zirconium oxide base member 12. The tubular substrate has an open end 11 and a closed end 13. On both inside and outside of the tubular substrate, thin (1 to 5 microns) layers 14, 15 of platinum are deposited such as by plating in the manner of the aforementioned U.S. Pat. No. 4,265,930. These layers are for an oxygen sensor and are not otherwise necessary for the invention. The zirconia tube wall thickness typically ranges from about 0.5 mm to 1.5 mm. The objective is to thermal spray a spinel (alumina with 26–30 wt % of magnesia) coating 16 to about 500 microns thickness on the outer platinum surface 18 to form the oxygen sensor.

Figure 2:
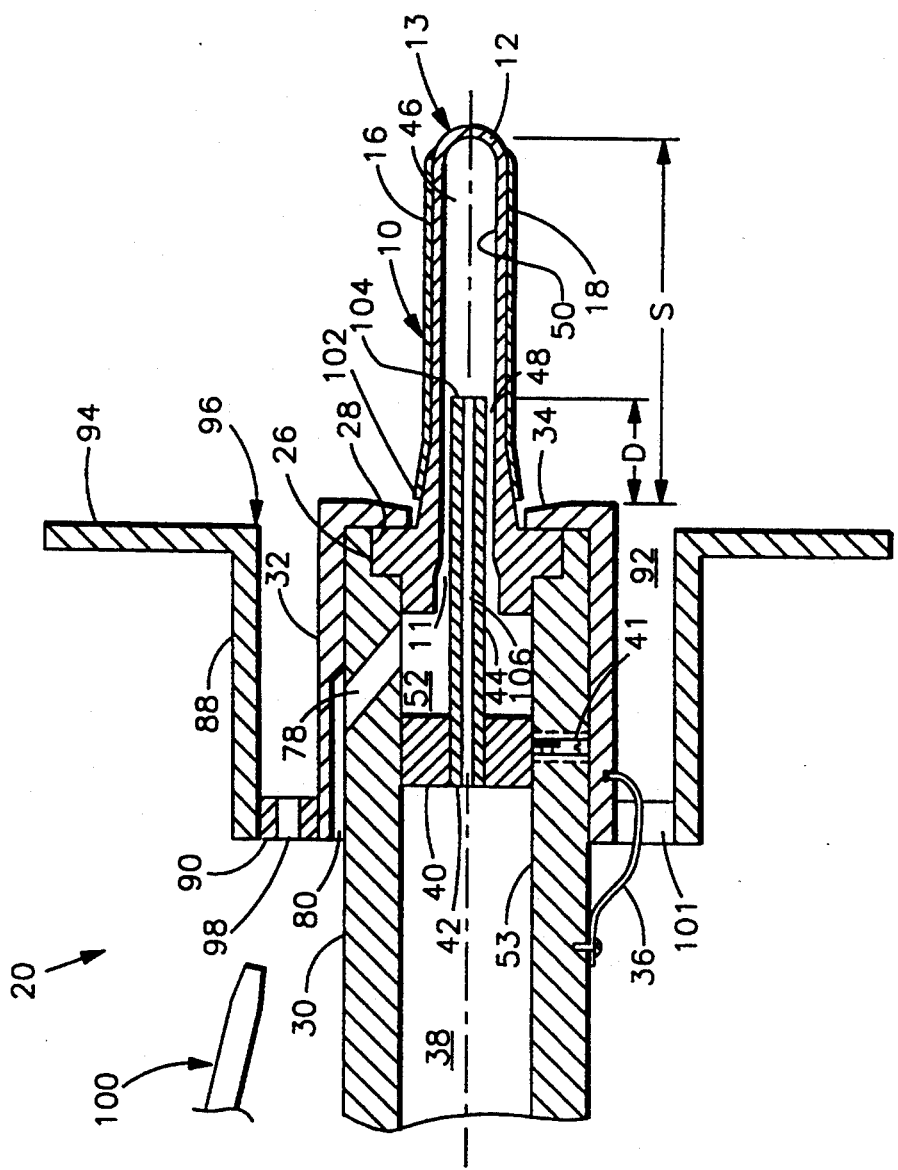
FIG. 2 is a longitudinal section of an apparatus incorporating the invention.
Figure 3:
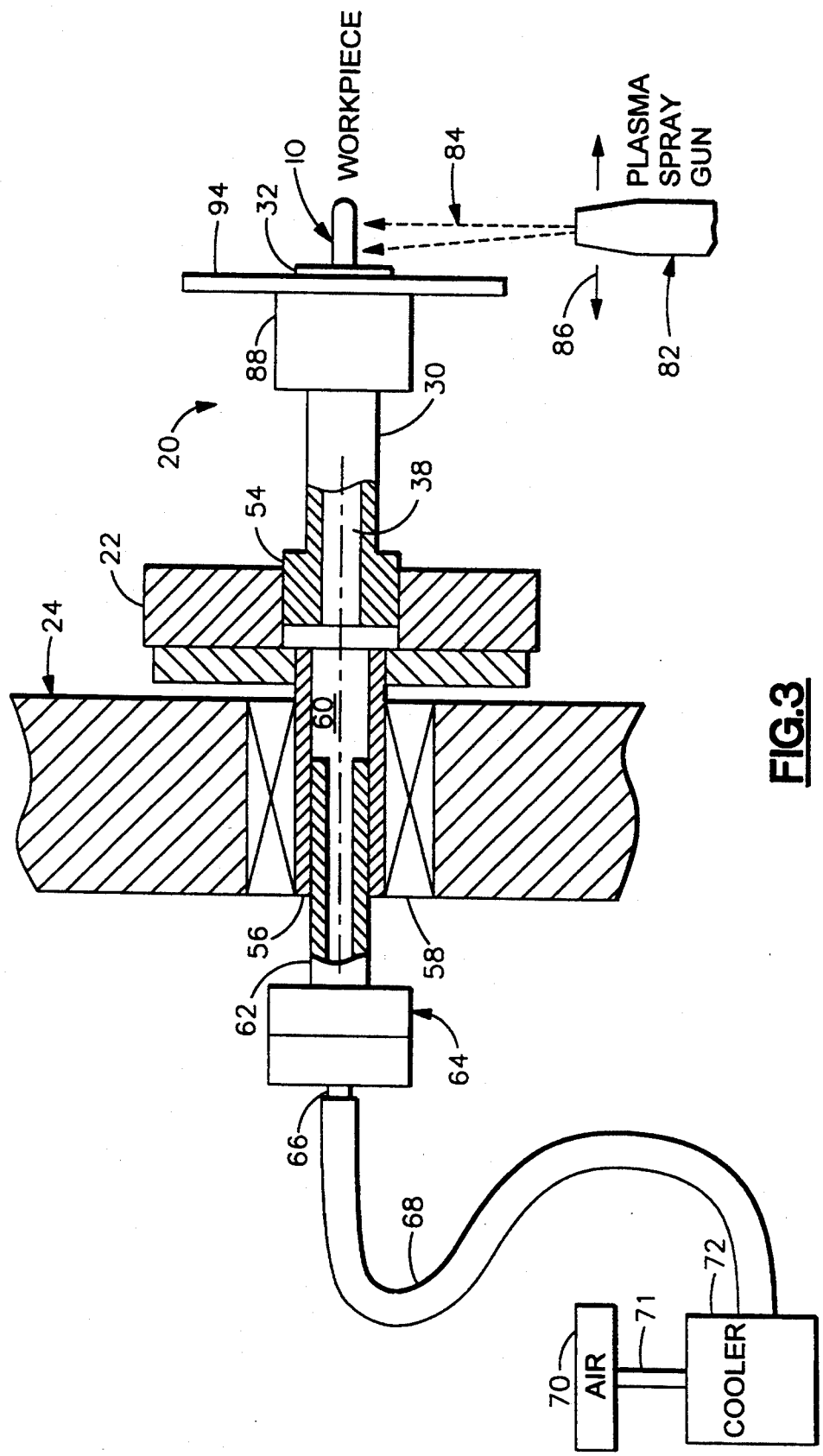
FIG. 3 is a longitudinal view in partial section of a mounting of the apparatus of FIG. 2, and an air supply thereto.

The substrate 10 is mounted (FIG. 2) at its open end 11 on a rotatable fixture 20 which, in turn, is mounted on the headstock 22 (FIG. 3) or the like from a base support 24 such as a lathe.

The fixture may hold the substrate 10 in any convenient or desired manner consistent with the invention. In the present case (FIG. 2) the substrate 10 has a flange 26 that forms a support portion of the oxygen sensor in its ordinary use. The flange sits in a countersunk hole 28 in the end of a tubular member 30 of the fixture 20. A removable sleeve 32 with an inward flange 34 fits over the tubular member so that the inward flange retains the substrate flange 26 in the hole. A spring clip 36 holds the sleeve in place. Thus a series of substrates may be placed successively in the fixture for coating operations. Other support means may be selected for quick changing in a production coating setup for oxygen sensors or other objects of similar configuration to be coated.

The tubular support member 30 has a bore 38 therethrough. Partway back is a plug 40 in the bore held by a set screw 41 and having a central hole 42 therein into which an axial tube 44 is sealed. The tube extends forwardly into the cavity 46 of the tubular substrate 10. The tube is sufficiently smaller than the inside diameter of the substrate so as to delimit an annular channel 48 with the inner surface 50 of the substrate, the channel leading back to the annular region 52 of bore 38 between the plug and the substrate and between the tube 44 and the wall 53 of member 30.

A base 54 (FIG. 3) of the support member 30 is held by the headstock 22 which is attached to an axle 56 that is supported conventionally in bearings 58 in the lathe 24 and is driven by a motor (not shown). The axle is provided with an axial duct 60 connecting to a pipe 62. At the end of the pipe opposite the headstock, a conventional rotating seal 64 is attached. A hose fitting 66 on the seal is fixed (non-rotating) and attaches to a hose 68 which leads back to a source 70 of fluid coolant which may be a liquid but advantageously is a compressed gas such as air. The air may be cooled via a pipe 71 by a cooling system 72 with refrigerant or heat exchanger coils in utility water, ice water, liquid nitrogen, or the like. Thus chilled coolant is directed through a flow path comprising the hose 68, the rotating seal 64, the axle 56, the tubular member 30 and the cooling tube 44 into the tubular substrate 10.

The tube wall 53 (FIG. 2) has at least one radial passage 78 therethrough leading radially outwardly from the region 52. In case the removable sleeve 32 is in the way, an outer space 80 is provided in the sleeve between the tubular member and the sleeve. The outer end 13 being closed, a further flow path comprising the annular channel 48 in the substrate, the annular region 52, the diagonal passage 78 and the outer space 80, provides for an outflow of the air coolant from inside the substrate 10 into the ambient atmosphere.

A thermal spray gun 82 (FIG. 3) directs a hot spray stream 84 of the coating material to the substrate 10. With the substrate rotating, the gun may be given an oscillatory movement 86 in a direction longitudinal to the substrate, so as to effect the coating 16 thereon. Thus, with coolant flowing, the coating is applied without overheating the substrate and, particularly in the case of a ceramic substrate, without cracking it.

For protection of the fixture components from the spray stream and heat of the thermal spray, the fixture 20 (FIG. 2) may be provided with an outer sleeve 88 affixed to the inner sleeve 32 by a ring 90 so as to delineate another annular space 92 that acts as an insulator. An outwardly extending flange 94 on the outer sleeve, extending from a perimeter location 96 longitudinally proximate the substrate 10, provides further protection. If additional cooling of the fixture is needed, the ring may contain a plurality of holes 98 (e.g. 8; one shown). A source of compressed air 100 may then be directed at the ring of holes while the fixture is being rotated, so that air flows continuously through sequential holes into the space between the sleeves. Alternatively, the ring with holes may be configured with impellers to force air through the space during rotation. A slot 101 in the ring 90 accomodates the spring 36.

It was discovered that a significant spacing between the inner end of the cooling tube and the closed end of the substrate provides for more efficient cooling, with even less tendency for the substrate ceramic to crack. In particular, a coating extremity 102 is determined at a selected separation S from the closed end 13. This extremity is the farthest separation away from the closed end that a coating is intended to be applied on the outer surface of the tubular substrate. In the present case this extremity coincides with the point of entry of the substrate into the fixture 20. Preferably the cooling tube 44 has its inner end 104 in the substrate cavity 46 disposed at a distance D from the extremity 102 between about 20% and 80% of the separation S and most preferably between about one quarter and one half of the separation. Thus a significant portion of the substrate cavity is clear for turbulence to enhance cooling. The cooling system is particularly suitable for small tubes, generally between about 2 cm and 10 cm in length, with an internal diameter between about 5 mm and 5 cm. It also is desirable, for maximum flow efficiency, for the axial passage 106 inside of the cooling tube to have a cross sectional area about equal to a cross sectional area for the annular channel 48. An example is 0.30 $cm^2$.

The present invention is also particularly suitable for coating a tubular ceramic substrate with a plasma thermal spray coating process at high spray rate. The high rate reduces the time of coating each part to save significant costs. This introduces considerably more heat and thermal stress into the substrate, but the cooling provided by the present invention makes the process viable.

For example, an oxygen sensor formed of a ceramic tube of zirconia having platinum layers as described above was about 90 mm long and 7 mm inside diameter. A cooling tube about 3 mm diameter was inserted about 35% of the way into the ceramic tube. A heavy duty plasma gun of the type described in the aforementioned U.S. Pat. No. 4,445,021 and sold as a Type 10MB plasma gun by The Perkin-Elmer Corporation was used to coat the sensor. Parameters were as follows: A spinel powder of size 10 to 75 microns was sprayed with a #820 nozzle on the gun, nitrogen plasma at 5.3 $kg/cm^2$ (75 psi) and 21 l/min (45 scfh) flow rate, hydrogen secondary gas at 3.5 $kg/cm^2$ (50 psi) and 13 l/min (28 scfh), spray rate of 60 g/min (8 pounds/hour) in a nitrogen carrier at 28 l/min (60 scfh), spray distance of 10 cm, traverse rate of 60 cm/sec, and rotational speed of 500 rpm for the substrate. Cooling air flow in to the substrate was 250 l/min (500 scfh). Coating thickness was 500 microns.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

We claim:

1. A fixture for cooling a tubular ceramic substrate during thermal spray coating thereof, the substrate having an inside surface, a generally cylindrical outside surface, an open end and a closed end, the fixture comprising support means for supporting the substrate at one end thereof, and a cooling tube mounted to extend coaxially through the open end into the substrate so as to delimit an annular channel between the inside surface and the cooling tube, the cooling tube having an outer end receptive of pressurized gas coolant such that coolant flows through the cooling tube into the substrate and thence out of the substrate via the annular channel, whereby the coolant cools the substrate during thermal spray coating of the outside surface.

2. The fixture of claim 1 wherein said one end is the open end.

3. The fixture of claim 1 wherein the outside surface is receptive of the coating between the closed end and a coating extremity at a selected separation from the closed end, and the cooling tube has an inner end disposed at a distance from the extremity between about one quarter and one half of the selected separation.

4. The fixture of claim 1 wherein the cooling tube has a passage therein with a cross sectional area about equal to a cross sectional area for the annular channel.

5. The fixture of claim 1 wherein the support means is rotatable, and the substrate is aligned coaxially with the support means so as to be rotatable on a longitudinal axis during the thermal spray coating thereof.

6. The fixture of claim 5 wherein the cooling tube is affixed to the support means so as to rotate therewith, and the fixture further comprises a rotatable seal connected with the outer end of the cooling tube, the seal having a fixed input portion receptive of the coolant.

7. The fixture of claim 5 wherein the support means comprises a tubular member adapted to support the substrate at the open end, and a plug sealed in the tubular member at a spacing from the open end, the cooling tube being affixed in an axial hole in the plug so as to extend through the open end into the substrate, the tubular member having a tube wall defining an annular region with the cooling tube, the annular region communicating with the annular channel in the substrate, and the tube wall having a radial passage therethrough leading outwardly from the annular region, whereby the coolant flows out of the annular channel through the annular region and the radial passage.

8. The fixture of claim 5 further comprising an outer sleeve mounted on the support means so as to delineate an annular space between the outer sleeve and the support means, whereby the sleeve and the annular space protect the support means from the thermal spray.

9. The fixture of claim 8 further comprising a flange extending outwardly from the outer sleeve from a perimeter location proximate the substrate so as to further protect the support means from the thermal spray.

10. The fixture of claim 8 further comprising means to force air through the annular space.

11. The fixture of claim 1 wherein the tubular substrate is a ceramic substrate for an oxygen sensor.

12. A fixture for cooling a tubular ceramic substrate during thermal spray coating thereof, the substrate having an inside surface, a generally cylindrical outside surface, an open end and a closed end, the fixture comprising a tubular member adapted to support the substrate coaxially at the open end, a plug sealed in the tubular member at a spacing from the open end, and a cooling tube affixed in an axial hole in the plug and extending coaxially through the open end into the substrate so as to delimit an annular channel between the inside surface and the cooling tube, the tubular member having a tube wall defining an annular region with the cooling tube, the annular region communicating with the annular channel in the substrate, the tube wall having a radial passage therethrough leading outwardly from the annular region, and the cooling tube having an outer end receptive of pressurized gas coolant such that coolant flows through the cooling tube into the substrate and thence out of the substrate via the annular channel, the annular region and the radial passage, whereby the coolant cools the substrate during thermal spray coating of the outside surface.

13. A method of cooling a tubular ceramic substrate during thermal spray coating thereof, the substrate having an inside surface, a generally cylindrical outside surface, an open end and a closed end, the method comprising supporting the substrate at one end thereof, extending a cooling tube coaxially through the open end into the substrate so as to delimit an annular channel between the substrate and the cooling tube, flowing pressurized gas coolant through the cooling tube from an outer end thereof into the substrate and thence out of the substrate via the annular channel, and thermal spray coating the outside surface of the substrate, whereby the coolant cools the substrate during the thermal spray coating.

14. The method of claim 13 wherein said one end is the open end.

15. The method of claim 13 wherein the outside surface is receptive of the coating between the closed end and a coating extremity at a selected separation from the closed end, and the cooling tube has an inner end disposed at a distance from the extremity between about one quarter and one half of the selected distance.

16. The method of claim 13 wherein the cooling tube has passage therein with a cross sectional area about equal to a cross sectional area for the annular channel.

17. The method of claim 13 further comprising rotating the substrate on a longitudinal axis thereof coaxial with the cooling tube during the step of thermal spray coating.

18. The method of claim 13 wherein the step of thermal spraying comprises thermal spraying a ceramic coating.

19. The method of claim 18 wherein the tubular substrate with the ceramic coating thereon constitutes an oxygen sensor.

* * * * *